(12) United States Patent
Juntunen et al.

(10) Patent No.: US 11,445,348 B2
(45) Date of Patent: Sep. 13, 2022

(54) BLUETOOTH PERIMETER EXTENSION

(71) Applicant: Ademco Inc., Golden Valley, MN (US)

(72) Inventors: Robert D. Juntunen, Minnetonka, MN (US); Steven C. Nichols, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 317 days.

(21) Appl. No.: 16/751,149

(22) Filed: Jan. 23, 2020

(65) Prior Publication Data
US 2021/0235248 A1   Jul. 29, 2021

(51) Int. Cl.
| | |
|---|---|
| *H04W 84/18* | (2009.01) |
| *H04W 4/80* | (2018.01) |
| *H04W 4/38* | (2018.01) |
| *G16Y 20/10* | (2020.01) |
| *G16Y 10/80* | (2020.01) |
| *G16Y 40/30* | (2020.01) |

(52) U.S. Cl.
CPC .............. *H04W 4/80* (2018.02); *H04W 4/38* (2018.02); *G16Y 10/80* (2020.01); *G16Y 20/10* (2020.01); *G16Y 40/30* (2020.01)

(58) Field of Classification Search
CPC ......... H04W 4/80; H04W 4/38; H04W 12/65; H04W 84/18; H04W 4/33; H04L 67/12; H04L 69/08; H04L 69/18; H04L 12/2832; G16Y 10/80; G16Y 20/10; G16Y 40/30
See application file for complete search history.

(56) References Cited

U.S. PATENT DOCUMENTS

| | | |
|---|---|---|
| 2016/0165387 A1 | 6/2016 | Nhu |
| 2018/0063485 A1 | 3/2018 | Sannala |
| 2018/0212826 A1 | 7/2018 | Klausen |
| (Continued) | | |

FOREIGN PATENT DOCUMENTS

| | | |
|---|---|---|
| CN | 107027092 A | 8/2017 |
| CN | 107787469 A | 3/2018 |
| WO | 2015171388 A1 | 11/2015 |

OTHER PUBLICATIONS

International Search Report and Written Opinion of International Application No. PCT/US2021/014287, dated Apr. 21, 2021, 16 pp.
(Continued)

*Primary Examiner* — Andrew Wendell
(74) *Attorney, Agent, or Firm* — Shumaker & Sieffert, P.A.

(57) ABSTRACT

In some examples, a system for comfort or security in a building and its premises includes a plurality of "first" devices configured to wirelessly communicate with a hub device that is a master for controlling the system for comfort or security in the building and premises, wherein the plurality of first devices and the hub device are configured to wirelessly communicate using either one of an IEEE 802.15.4 standard or a Bluetooth Low Energy (BTLE) 5.0 standard; a plurality of "second" devices that are battery powered and configured to wirelessly communicate with respective ones of the plurality of first devices, wherein the plurality of second devices and respective ones of the plurality of first devices are configured to communicate using the BTLE 5.0 standard, wherein the hub device and the plurality of second devices are configured to communicate with each other via respective ones of the plurality of first devices.

14 Claims, 5 Drawing Sheets

(56) References Cited

U.S. PATENT DOCUMENTS

2019/0385113 A1* 12/2019 Dumitras ................. G07C 1/10
2020/0137533 A1* 4/2020 Gattu ....................... H04Q 9/02

OTHER PUBLICATIONS

Carhaciogui et al., "Time-Domain Cooperative Coexistence of BLE and IEEE 802.15.4 Networks", IEEE, Feb. 15, 2018, pp. 7.
Cassia Networks, "S2000 Bluetooth Router," accessed from https://www.cassianetworks.com/products/s2000-bluetooth-router/ on or about Aug. 13, 2019, 5 pp.
Eee, "IEEE Standard for Low-Rate Wireless Networks," IEEE std 802.15.4, Revision of 802 15.4-2011, published Apr. 22, 2016, 708 pp.
Ergen, "ZigBee/IEEE 802.15.4 Summary," Sep. 10, 2004, 37 pp.
"Bluetooth low energy overview," accessed from https://developer.android.com/guide/topics/connectivity/bluetooth-le on or about Jan. 7, 2020, 12 pp.

* cited by examiner

BLUETOOTH PERIMETER EXTENSION

TECHNICAL FIELD

This disclosure relates to home monitoring, comfort, and security systems.

BACKGROUND

Modern residential buildings or other buildings may include a central "hub" device configured to manage one or more systems within the building, such as monitoring systems, comfort systems, and/or other security systems. The hub device may be in wireless communication with a number of other devices, such as sensors, placed throughout the building. The central hub device may wirelessly transmit commands or instructions to one or more controllable devices to perform operations of the controllable devices.

SUMMARY

In general, this disclosure relates to systems, devices, and techniques for extending the range and/or the reach of wireless data communications between various devices within a networked system (e.g., security and/or comfort system), at least in part by using a set of first devices as intermediaries to wirelessly relay messages between a set of battery-powered second devices and a central hub device, even when the first devices may be battery powered themselves. Having battery-powered second devices may be beneficial because these devices are not tethered to an electrical outlet within a building, and therefore may significantly extend the reach and/or range of the networked system, such as to an outer perimeter of the building. However, there may be technical limitations about the communication capabilities of the battery-powered second devices. The techniques described in this disclosure provide for examples of practical applications that may improve the wireless communication capabilities between devices in a networked security and/or comfort system.

In some examples, a system for comfort or security in a building and the surrounding premises includes a plurality of first devices configured to wirelessly communicate with a hub device that is a master for controlling the system for comfort or security in the building and premises, wherein the plurality of first devices and the hub device are configured to wirelessly communicate using either one of an IEEE 802.15.4 standard or a Bluetooth Low Energy (BTLE) 5.0 standard; a plurality of second devices that are battery powered and configured to wirelessly communicate with respective ones of the plurality of first devices, wherein the plurality of second devices and respective ones of the plurality of first devices are configured to communicate using the BTLE 5.0 standard, wherein the hub device and the plurality of second devices are configured to communicate with each other via respective ones of the plurality of first devices.

In some examples, a method for communicating in a system for comfort or security in a building and premise includes: wirelessly communicating between a plurality of first devices and a hub device, wherein the hub device is a master for controlling the system for comfort or security in the building and premises, and wherein the plurality of first devices and the hub device are configured to wirelessly communicate using either one of an IEEE 802.15.4 standard or a Bluetooth Low Energy (BTLE) 5.0 standard; and wirelessly communicating between a plurality of second devices that are battery powered, and respective ones of the plurality of first devices using the BTLE 5.0 standard, wherein the hub device and the plurality of second devices are configured to communicate with each other via respective ones of the plurality of first devices.

The details of one or more examples of the disclosure are set forth in the accompanying drawings and the description below. Other features, objects, and advantages will be apparent from the description, drawings, and claims.

DETAILED DESCRIPTION

Modern residential buildings or other buildings may include a central "hub" device configured to manage one or more systems within the building, such as monitoring systems, comfort systems, or other security systems. The hub device may be in wireless communication with a number of other devices placed throughout the building. For example, the central hub device may wirelessly receive sensor data from any number of different sensors, such as motion sensors, air quality and/or temperature sensors, infrared sensors, or door and/or window contact sensors. Additionally, the central hub device may wirelessly transmit commands or instructions to one or more controllable devices. For example, the central hub device may instruct a thermostat to adjust a temperature within the building, or in another example, may command a damper to open or close an air vent.

However, some devices based on 2.4 gigahertz (GHz) technologies (e.g., Wi-Fi, Bluetooth, etc.) may be unable to propagate wireless data into locations where either an intervening material or the sheer distance of the propagation significantly attenuates the electromagnetic signal before it reaches a destination device. For example, devices located outside the building (e.g., in a yard), or devices located within a metal air vent or duct, may be unable to wirelessly communicate with the central hub device located elsewhere inside the building. In some examples in accordance with this disclosure, a plurality of first devices may be configured with the Bluetooth Low Energy (BTLE) 5.0 standard, such that they may relay data between a central hub device and a plurality of battery-powered second devices that may be otherwise unable to wirelessly communicate directly with the central hub device. Additionally, the plurality of first devices may be configured to convert data transmissions between two different wireless protocol formats, such as between BTLE 5.0 and IEEE 802.15.4, so as to utilize one or more properties of either wireless protocol.

Figure 1:
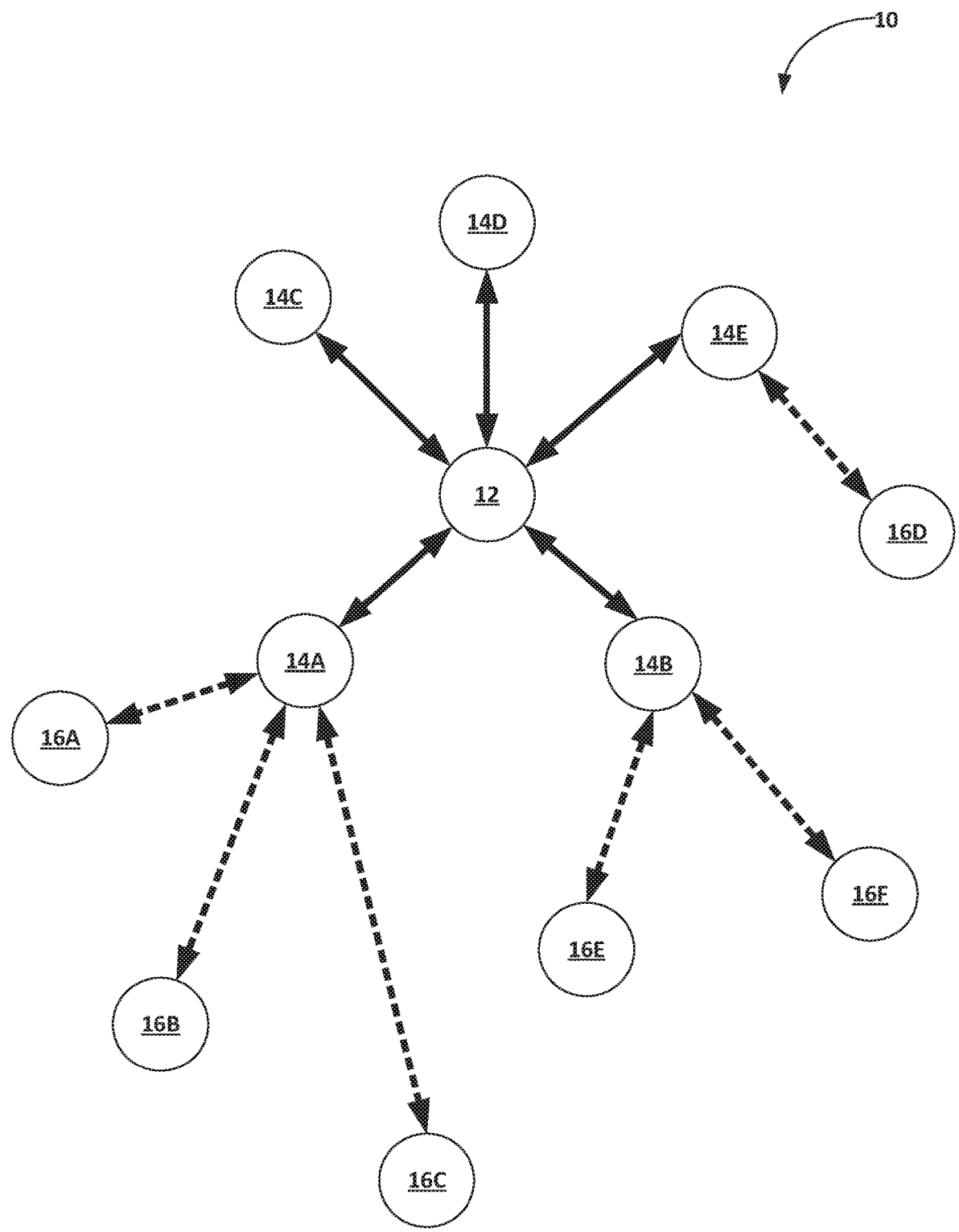
FIG. 1 is a conceptual diagram illustrating a networked comfort and/or security system, in accordance with some examples of this disclosure.

FIG. 1 is a conceptual diagram illustrating a networked comfort and/or security system 10, in accordance with some examples of this disclosure. System 10 may include a plurality of networked devices (e.g., devices in wireless communication with each other). System 10 may be installed within a building and the surrounding premises (referred to collectively in this disclosure as a "premise"). System 10 includes a central hub device 12, a plurality of first devices 14A-14E (collectively, "first devices 14"), and a plurality of second devices 16A-16F (collectively, "second devices 16"). First devices 14 and second devices 16 are identified as "first" and "second" to differentiate the devices.

Hub device 12 includes a computing device configured to operate one or more systems within a building, such as comfort, security, and/or safety systems. For example, as described further below, hub device 12 may include at least a memory and processor configured to receive data, such as received from one or more devices and/or from user input, and process the data in order to automate one or more systems within a building. For example, hub device 12 may automate, control, or otherwise manage systems including heating and cooling, ventilation, illumination, or authorized access to individual rooms or other regions, as non-limiting examples. For example, hub device 12 may a "Life and Property Safety Hub®" of Resideo Technologies, Inc.®, of Austin, Tex. Hub device 12 may typically include a wired connection to an electric power grid, but in some examples may include an internal power source, such as a battery or supercapacitor.

System 10 includes a plurality of first devices 14. Each of first devices 14 is defined by the property that it is in direct wireless data communication with hub device 12. In other words, each first device 14 either directly wirelessly transmits data to hub device 12, directly wirelessly receives data from hub device 12, or both. Accordingly, there may be at least two categories of devices included within first devices 14, although an individual "first" device may fall into both categories simultaneously. Sensor devices may be configured to collect or generate sensor data, and transmit the sensor data to hub device 12 for processing. Controllable devices may be configured to perform a specified function when it receives instructions (e.g., a command or other programming) to perform the function from hub device 12. Examples of different types of first devices 14 are included in the description of FIG. 2, below. First devices 14 may include either a wired connection to an electric power grid or an internal power source, such as a battery or supercapacitor.

The wireless data communications between hub device 12 and each of first devices 14, as indicated by the solid, double-headed arrows in FIG. 1, may conform to a wireless communication protocol. Examples of different wireless communication protocols include Wi-Fi, Bluetooth, IEEE 802.15.4, or Long-Term Evolution (LTE). In examples in which hub device 12 and the first device 14 communicate using the Bluetooth Low Energy (BTLE) 5.0 standard, both hub device 12 and first device 14 may be battery powered, since the transmit and receive functions will not tax the batteries enough to prevent the respective devices from functioning. However, if hub device 12 and first device 14 communicate using any other communication standard (e.g., a non-low-energy protocol, such as IEEE 802.15.4), then hub device 12 and/or first device 14 may be electric-grid-powered in order to supply sufficient energy to power the transmissions. For example, a device may be said to be "electric-grid-powered" if it receives continuous energy from an electric power grid that powers the current premises, other premises, and/or any or all electricity-based devices therein.

System 10 includes a plurality of second devices 16. Each of second devices 16 is defined by the property that it may communicate indirectly with hub device 12 through one of first devices 14 acting as an intermediary or "repeater" device. For example, regardless of whether any particular first device 14 communicates with hub device 12 via the BTLE 5.0 standard, each first device 14 may be configured with the ability to receive and/or transmit data via the BTLE 5.0 protocol. One feature of the BTLE 5.0 protocol is the ability to use a device, such as one of first devices 14, to relay communications between two other devices, such as hub device 12 and one or more of second devices 16. In other words, each second device 16 either indirectly wirelessly transmits data to hub device 12, indirectly wirelessly receives data from hub device 12, or both. Accordingly, just as with first devices 14, there may be at least two categories of devices included within second devices 16, although an individual "second" device may fall into both categories simultaneously. Sensor devices may be configured to collect or generate sensor data, and indirectly transmit the sensor data to hub device 12 for processing. Controllable devices may be configured to perform a specified function when it indirectly receives instructions (e.g., a command or other programming) to perform the function from hub device 12. Examples of different types of "second" devices are included in the description of FIG. 2, below. Second devices 16 may typically be battery powered, but in some examples may include a wired connection to an electric power grid.

The wireless data communications between second devices 16 and first devices 14, as indicated by the dashed, double-headed arrows in FIG. 1, may conform to a wireless communication protocol, as described above. of different wireless communication protocols include Wi-Fi, Bluetooth, IEEE 802.15.4, or Long-Term Evolution (LTE). In examples in which a second device 16 and a first device 14 communicate using the Bluetooth Low Energy (BTLE) 5.0 standard, both second device 16 and first device 14 may be battery powered, since the transmit and receive functions will not tax the batteries enough to prevent the respective devices from functioning. However, if second device 16 and first device 14 communicate using any other communication standard (e.g., a non-low-energy protocol, such as IEEE 802.15.4), then second device 16 and/or first device 14 may be electric-grid-powered in order to supply sufficient energy to power the transmissions.

In some examples in accordance with this disclosure, each of first devices 14 may be configured to not only relay wireless data communications via the BTLE 5.0 protocol, but also to convert the format of the received data so as to relay the data according to a different wireless protocol than the one under which it was received. For example, a second device 16 may wirelessly transmit data via BTLE 5.0 to a first device 14, which may then relay the data to hub device 12 via IEEE 802.15.4. In another example, hub device 12 may wirelessly transmit data via IEEE 802.15.4 to a first device 14, which may then relay the data to a second device 16 via BTLE 5.0. In this way, each of first devices 14 may extend the reach of hub device 12 to one or more second devices 16, which may otherwise be outside of communication range as described above, while allowing second devices 16 and or first devices 14 to remain battery powered.

In some examples, one or more of the second devices 16, like the first devices 14, may be additionally configured to communicate directly with hub device 12 via any applicable wireless protocol, such as Bluetooth or IEEE 802.15.4, whenever possible. For example, second devices 16 may be configured to communicate directly with hub device 12 by default whenever a functioning wireless data connection is available. However, when either or both of second device 16 or hub device 12 determines that a direct wireless connection is unavailable (e.g. the respective devices are out of communication range of one another), the respective second device 16 may switch over to communicate indirectly with hub device 12 via an intermediate first device 14 instead.

In some examples, during an initial installation process, an installer of one of second devices 16 may determine that the second device is unable to communicate directly with hub device 12. In these examples, the installer may configure the second device 16 to scan for an intermediate first device 14, or additionally or alternatively, may configure a first device 14 to scan for the respective second device 16, and upon one or both of the devices "discovering" the other, the installer may configure the second device 16 to communicate indirectly with hub device 12 via the intermediate first device 14.

Figure 2:
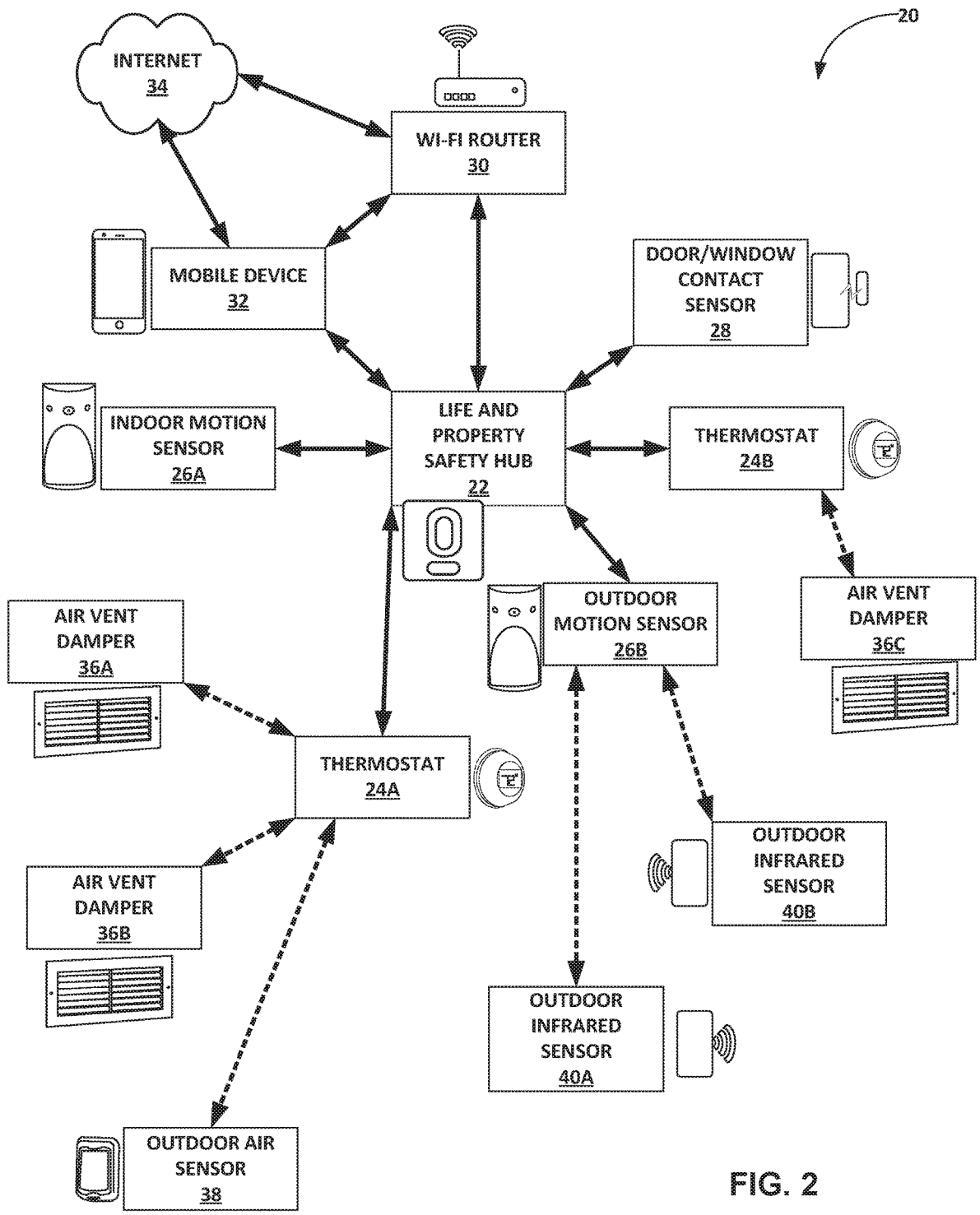
FIG. 2 is a conceptual block diagram illustrating an example of the networked system of FIG. 1, in accordance with some examples of this disclosure.

FIG. 2 is a conceptual block diagram illustrating a networked system 20, which may be one example of the networked system 10 of FIG. 1, in accordance with some examples of this disclosure. System 20 includes a central hub 22; a plurality of "first" devices 24A 24B, 26A, 26B, and 28; a plurality of "second" devices 36A-C, 40A, and 40B; a router 30; and a mobile device 32. It is to be understood that system 20 is one non-limiting example of the techniques of this disclosure. Other example systems may include more, fewer, or different components and/or devices.

System 20 includes a central hub device 22 in direct wireless data communication with a plurality of devices 24A 24B, 26A, 26B, and 28. Devices 24A 24B, 26A, 26B, and 28, which may be examples of first devices 14 of FIG. 1, include thermostat 24A, thermostat 24B, indoor motion sensor 26A, outdoor motion sensor 26B, and door and/or window contact sensor 28. Each of these devices includes either a sensor device (e.g., a device configured to collect and/or generate sensor data), a controllable device, or both, as described above. For example, thermostats 24A, 24B (collectively, thermostats 24) may include comfort devices having sensors, such as a thermometer configured to measure an air temperature.

Thermostats 24 may be configured to wirelessly transmit the temperature (e.g., sensor data) directly to hub device 22. Additionally, thermostats 24 may include controllable devices, in that they may activate or deactivate a heating, cooling, or ventilation system in response to receiving instructions from hub device 22. In one particular example, thermostat 24A may collect temperature data and transmit the data to hub device 22. Hub device 22, in response to receiving the temperature data, may determine that a respective room is either too hot or too cold based on the temperature data, and transmit a command to thermostat 24A to activate a heating or cooling system as appropriate. In this example, each of thermostats 24 may include both sensor devices and controllable devices within a single distinct unit.

In another example, indoor and outdoor motion sensors 26A, 26B (collectively, motion sensors 26) may include security devices configured to detect the presence of a nearby mobile object based on detecting a signal, such as an electromagnetic signal, an acoustic signal, a magnetic signal, a vibration, or other signal. The detected signal may or may not be a reflection of a signal transmitted by the same device. In response to detecting the respective signal, motion sensors 26 may generate sensor data indicating the presence of an object, and wirelessly transmit the sensor data to hub device 22. Hub device 22 may be configured to perform an action in response to receiving the sensor data, such as outputting an alert, such as a notification to mobile device 32, or by outputting a command for the respective motion sensor 26 to output an audible or visual alert. In this example, each of motion sensors 26 may include both sensor devices and controllable devices within a single unit.

In another example, door and/or window contact sensor 28 may include a security device configured to detect the opening of a door or window on which the device is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to hub device 22. In response to receiving the sensor data, hub device may be configured to perform an action such as outputting an alert, such as a notification to mobile device 32, or by outputting a command for the respective contact sensor 28 to output an audible or visual alert. In this example, contact sensor 28 may include a sensor devices and a controllable devices within a single unit.

System 20 includes a central hub device 22 in indirect wireless data communication (e.g., communication via an intermediary device) with a plurality of devices 36A-36C, 38, 40A, and 40B. Devices 36A-36C, 38, 40A, and 40B, which may be examples of "second" devices 16 of FIG. 1, include air vent dampers 36A-36C, outdoor air sensor 38, and passive infrared sensors (PIRs) 40A, 40B. Each of these devices includes either a sensor device (e.g., a device configured to collect and/or generate sensor data), a controllable device, or both, as described above. For example, air vent dampers 36A-36C (collectively, "dampers 36") may include devices located within an air vent or air duct, configured to either open or close the shutters of an air vent in response to receiving instructions from hub device 22. Typically, the metal housing of the air vent may block or otherwise attenuate the electromagnetic signal containing those instructions, especially if hub device is located relatively far away from the respective damper 36.

In another example, outdoor air sensor 38 may be configured to generate sensor data indicating, for example, a temperature, humidity, and/or quality (e.g., carbon monoxide, particulate matter, or other hazards) of the surrounding air, and then wirelessly transmit the sensor data to hub device 22. Typically, because hub device 22 may be located inside a building and air sensor 38 may be located outside the building, the distance and/or the material composing the building's walls may block or otherwise attenuate the electromagnetic signal containing that sensor data.

In another example, outdoor passive infrared sensors 40A, 40B (collectively, PIRs 40) may include security devices configured to detect the presence of a nearby object, such as a person, based on detecting infrared (IR) wavelength electromagnetic waves emitted by the object. In response to detecting the IR waves, PIRs 40 may generate sensor data indicating the presence of the object, and wirelessly transmit the sensor data to hub device 22. Hub device 22 may be configured to perform an action in response to receiving the sensor data, such as outputting an alert, such as a notification to mobile device 32, or by outputting a command for the respective PIR 40 to output an audible or visual alert.

Typically, because PIRs 40 may be located outside a building and hub device 22 may be located inside the building, the distance and/or the material composing the building's walls may block or otherwise attenuate the electromagnetic signals containing the sensor data and/or the alert command.

However, in some examples in accordance with this disclosure, any or all of first devices 24A 24B, 26A, 26B, and 28 may be configured with the BTLE 5.0 protocol, such that the respective first device may relay messages between hub device 22 and one or more of second devices 36A-C, 40A, and/or 40B, thereby extending the reach and/or range of hub device 22 to these "second" devices. For example, thermostat 24A may be configured to relay messages between hub device 22 and air vent dampers 36A, 36B, and outdoor air sensor 38. Outdoor motion sensor 26B may be configured to relay messages between hub device 22 and outdoor infrared sensors 40A, 40B. Thermostat 24B may be configured to relay messages between hub device 22 and air vent damper 36C. Contact sensor 28, although not depicted in FIG. 2 as acting as a relay between two devices, may be configured with the capability to perform this function should additional device(s) be added to system 20 in the future.

Figure 3:
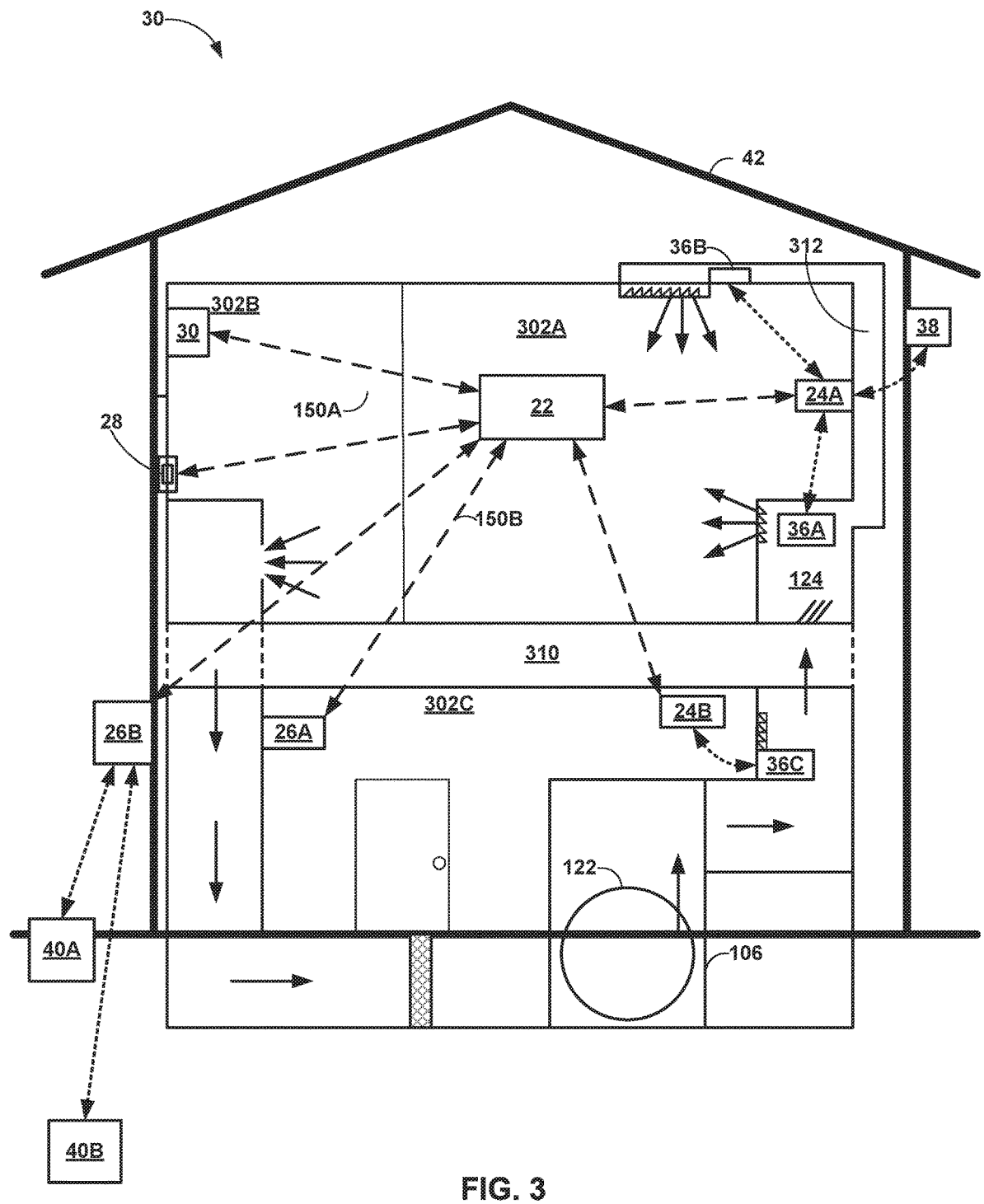
FIG. 3 is a conceptual block diagram illustrating an example implementation of the networked system of FIG. 2 within a building, in accordance with some examples of this disclosure.

FIG. 3 is a conceptual block diagram illustrating an example networked system 30, in accordance with some examples of this disclosure. Networked system may be an example of networked system 20 of FIG. 2 implemented within a building 42. Although building 42 is depicted in the general form of a residential house, building 42 may include any type of building or other structure, such as a commercial building or military building. System 30 includes a central hub device 22 located within a first room 302A of building 42. Central hub device 22 is in wireless communication with a plurality of "first" devices, such as thermostat 24A located in room 302A and thermostat 24B located in a lower-level room 302C. Either or both of thermostats 24 are configured to control a ventilation system 124 (having a blower 122), and/or a heating and/or cooling system, such as fuel-burning heater 106. Central hub device 22 is additionally in wireless communication with at least one indoor motion sensor 26A, at least one outdoor motion sensor 26B, and window contact sensor 28, as part of a networked security system. Hub device 22 may communicate with each of these first devices via a first wireless communication protocol, such as the IEEE 802.15.4 protocol. Hub device 22 may additionally be in wireless communication, such as via the Wi-Fi protocol, with wireless router 30, located in room 302B of building 42.

System 30 additionally includes a plurality of "second" devices which may be unable to wirelessly communicate with hub device 22, due to either their relatively large distance from hub device 22 or one or more materials located between them. For example, outdoor passive infrared (PIR) sensors 40 are located too far from hub device to communicate directly using the IEEE 802.15.4 standard. However, PIR sensors 40 may instead communicate sensor data via BTLE 5.0 to outdoor motion sensor 26B, which may then relay the communications directly to hub device 22. In some examples, outdoor motion sensor 26B may convert the received sensor data from a BTLE 5.0 format to an IEEE 802.15.4 format before relaying the data to hub device 22 via the IEEE 802.15.4 protocol. In this way, system 30 is able to project or extend a security system from an interior hub device 22 to an outer perimeter of a premise.

Similarly, although air vent dampers 36A, 36B may be located in a same room as hub device 22, due to the metal structure of the air duct in which the devices are located, the dampers 36 may be unable to communicate directly with hub device 22. Instead, hub device 22 may transmit program instructions to thermostat 24A, which may be substantially closer to either or both of dampers 36A, 36B, and therefore more likely to be able to successfully relay the program instructions to the dampers. The program instructions may include a command to either open or close a respective air vent.

Similarly, due to either a large distance between hub device 22 and damper 36C, or intervening materials such as floor/ceiling 310 and or the respective metal air duct, hub device 22 may be unable to communicate directly with damper 36C. Instead, because thermostat 24B may be configured with the BTLE 5.0 protocol, thermostat 24B may relay program instructions from hub device 22 to damper 36C, particularly due to the proximity between thermostat 24B and damper 36C ensuring strong wireless communication between the two devices. In this way, system 30 is able to project or extend wireless communications into hard-to-reach areas such as an air duct.

Similarly, due to either a large distance between hub device 22 and outdoor air sensor 38, or intervening materials such as exterior wall 312 of building 42, hub device 22 may be unable to communicate directly with outdoor air sensor 38. Instead, because thermostat 24A may be configured with the BTLE 5.0 protocol, thermostat 24A may relay sensor data from air sensor 38 to hub device 22, particularly due to the proximity between thermostat 24A and air sensor 38 ensuring strong wireless communication between the two devices. In this way, system 30 is able to project or extend wireless communications from an outdoor sensor device to a distant indoor hub device 22.

Figure 4:
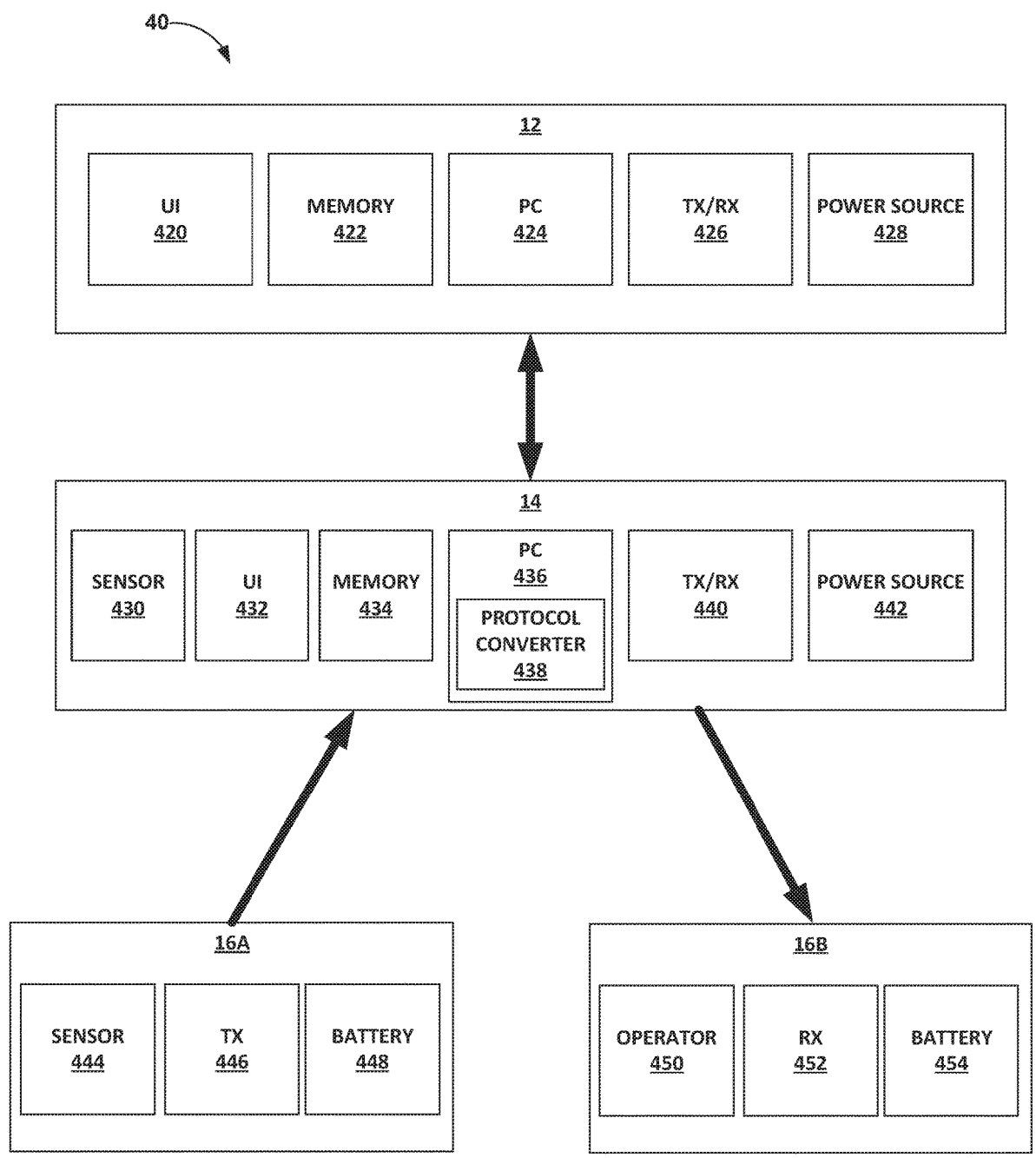
FIG. 4 is a conceptual block diagram of a plurality of networked comfort and/or security devices, in accordance with some examples of this disclosure.

FIG. 4 is a conceptual block diagram illustrating some example components of a system 40 of networked comfort and/or security devices, in accordance with some examples of this disclosure. System 40 may be an example of any of the previous systems 10, 20, or 30, or vice versa. System 40 includes central hub device 12, a "first" device 14, a sensor device 16A, and a controllable device 16B. Although sensor device 16A and controllable device 16B are depicted in FIG. 4 as separate entities, in some examples, a single integrated "second" device may perform the functions of both devices.

Central hub device 12 includes at least a user interface (UI) 420, a memory 422, processing circuitry (PC) 424, data transmission and receiving capabilities 426, and a power source 428. UI 420 is configured to receive data input from, or output data to, a user. For example, UI 420 may include a display screen, such as a touchscreen, keyboard, buttons, microphone, speaker, camera, or any other user input/output device. Other examples of UI 420 are possible. For example, during an initial setup process, hub device 12 may "scan" a local proximity in order to identify one or more other devices (e.g., devices having recognizable wireless communication capabilities), and then output for display on a display screen a list of discovered devices such that a user may select one or more of the devices to connect to. Via UI 420, a user may also specify one or more parameters in order to control or otherwise manage a comfort and/or security system within a building and the surrounding premises. For example, via UI 420, a user may specify one or more air temperature settings or security settings, such as access codes and/or authorized users.

Hub device 12 includes a memory 422 configured to store data, as well as instructions that, when executed by processing circuitry (PC) 424, cause hub device 12 to perform one or more techniques in accordance with this disclosure. Transmission (TX) and receiving (RX) circuitry 426 may include components, such as an antenna, configured to wirelessly transmit and receive data according to one or more wireless communication protocols. For example, TX/RX 426 may be configured to transmit and/or receive data according to either or both of the IEEE 802.15.4 protocol and/or the BTLE 5.0 protocol where appropriate, according to one or more constraints of the respective data communication protocols (e.g., communication range, energy requirements, etc.).

Power source 428 may include a wired connection to an electric power grid, due to the energy-intensive operations performed by hub device 12. However, in some examples, power source 428 may additionally or alternatively include an internal power source, such as a battery or supercapacitor.

"First" device 14 includes a device configured to directly wirelessly communicate with hub device 12. First device 14 is also configured to relay wireless data communications between hub device 12 and a "second" device, such as sensor device 16A and/or controllable device 16B, according to the BTLE 5.0 protocol. First device 14 may include an incorporated sensor 430, a UI 432, a memory 434, processing circuitry (PC) 436 having a protocol converter module 438, transmission (TX) and receiving (RX) circuitry 440, and a power source 442.

In some examples, first device 14 may include an incorporated sensor device, such as a motion sensor; passive infrared (PIR) sensor; air temperature and/or humidity sensor; air quality (e.g., carbon monoxide or particulate matter) sensor; or a door or window contact sensor, as non-limiting examples.

UI 430 is configured to receive data input from, or output data to, a user. For example, UI 430 may include a display screen, such as a touchscreen, keyboard, buttons, microphone, speaker, camera, or any other user input/output device. Other examples of UI 430 are possible. For example, during an initial setup process, first device 14 may "scan" a local proximity in order to identify one or more hub devices and/or "second" devices (e.g., second devices having recognizable wireless communication capabilities), and then output for display on a display screen a list of discovered devices such that a user may select one or more of the devices to connect to. Via UI 430, a user may also specify one or more parameters in order to control or otherwise manage a comfort and/or security system within a building and the surrounding premises. For example, via UI 430, a user may specify one or more air temperature settings (e.g., for a thermostat) or security settings, such as access codes and/or authorized users.

First device 14 includes a memory 434 configured to store data, as well as instructions that, when executed by processing circuitry (PC) 436, cause first device 14 to perform one or more techniques in accordance with this disclosure. In particular, PC 436 may be configured to perform at least two primary functions. PC 436 may be configured with the standards set by the BTLE 5.0 protocol, allowing first device 14 to act as a repeater device, forwarding communications between hub device 22 and another device, such as second devices 16A and/or 16B.

As illustrated, PC 436 includes a protocol converter 438 (e.g., implemented as hardware, software executing on hardware, or a combination thereof), configured to convert the format of data (e.g., the "capsule" of a data "packet") that is received under one wireless communication protocol into the format of a different communication protocol before first device 14 wirelessly forwards the data to another device. For example, first device 14 may receive sensor data from sensor 16A via the BTLE 5.0 protocol. Protocol converter 438 may then convert the received BTLE 5.0 data to the IEEE 802.15.4 format before forwarding the sensor data to hub device 12.

Typically, a single device may not be able to forward a data packet under a different protocol format from the one in which it was received, because different wireless protocols implement different timing mechanisms (e.g., the internal "clock" that governs data processing and transfer). However, PC 436 (e.g., protocol converter 438) is configured to convert a data packet from a received-protocol timing format to a transmission-protocol timing format in order to account for the data-transfer timing discrepancy. For example, a single radio antenna (e.g., TX/RX 440) may only transmit or receive data via a single wireless protocol at any given time. Each wireless protocol may be configured to operate (e.g., send or receive data) according to a structured set of designated "time slots," however, the respective protocol may include a certain degree of flexibility as to how the time slots are used. Accordingly, PC 436 or another external device may be configured to designate a first set of time slots to be used for one wireless protocol, and a second set of time slots for a second wireless protocol, wherein none of the first set of time slots overlap with any of the second set of time slots.

Transmission (TX) and receiving (RX) circuitry 440 may include components, such as an antenna, configured to wirelessly transmit and receive data according to one or more wireless communication protocols. For example, TX/RX 440 may be configured to transmit and/or receive data according to either or both of the IEEE 802.15.4 protocol and/or the BTLE 5.0 protocol where appropriate, according to the constraints of the respective data communication (e.g., communication range, power requirements, etc.).

Power source 442 may include an internal power source, such as a battery or supercapacitor. However, in some examples, power source 442 may additionally or alternatively include a wired connection to an electric power grid.

Sensor device 16A includes a sensing mechanism 444, transmission circuitry 446, and an internal battery 448. Sensing mechanism 444 may include any sensor component of a building comfort and/or security system configured to collect sensor data, such as a motion sensor; passive infrared (PIR) sensor; air temperature and/or humidity sensor; air quality (e.g., carbon monoxide or particulate matter) sensor; or a door or window contact sensor.

In response to collecting sensor data, transmission circuitry 446 (e.g., an antenna) may be configured to wirelessly transmit the sensor data to first device 14 via the BTLE 5.0 protocol, wherein first device 14 may then forward the sensor data to hub device 12. Sensor device 16A may include an internal battery or supercapacitor 448.

Controllable device 16B includes an operator mechanism 450, transmission and receiving circuitry 452, and an internal battery 454. Operator mechanism 450 includes any circuitry, machinery, or other physical components configured to perform an action or other operation in response to receiving program instructions from hub device 12. For example, operator mechanism 450 may include a motor and/or other components configured to open or close an air vent damper. In other examples, operator mechanism 450 may include circuitry and other necessary components to activate a heating, cooling, or ventilation system. In other examples, operator mechanism 450 may include components configured to output an alert, such as an audible alarm, flashing lights, or other notification of a potential threat under a safety and security system.

Receiving circuitry 452 (e.g., an antenna) may be configured to receive program instructions from hub device 12 (via the BTLE 5.0 protocol from first device 14) commanding an action or operation to be performed by operator 450. In most examples, sensor device 16A may include an internal battery or supercapacitor 448.

Figure 5:
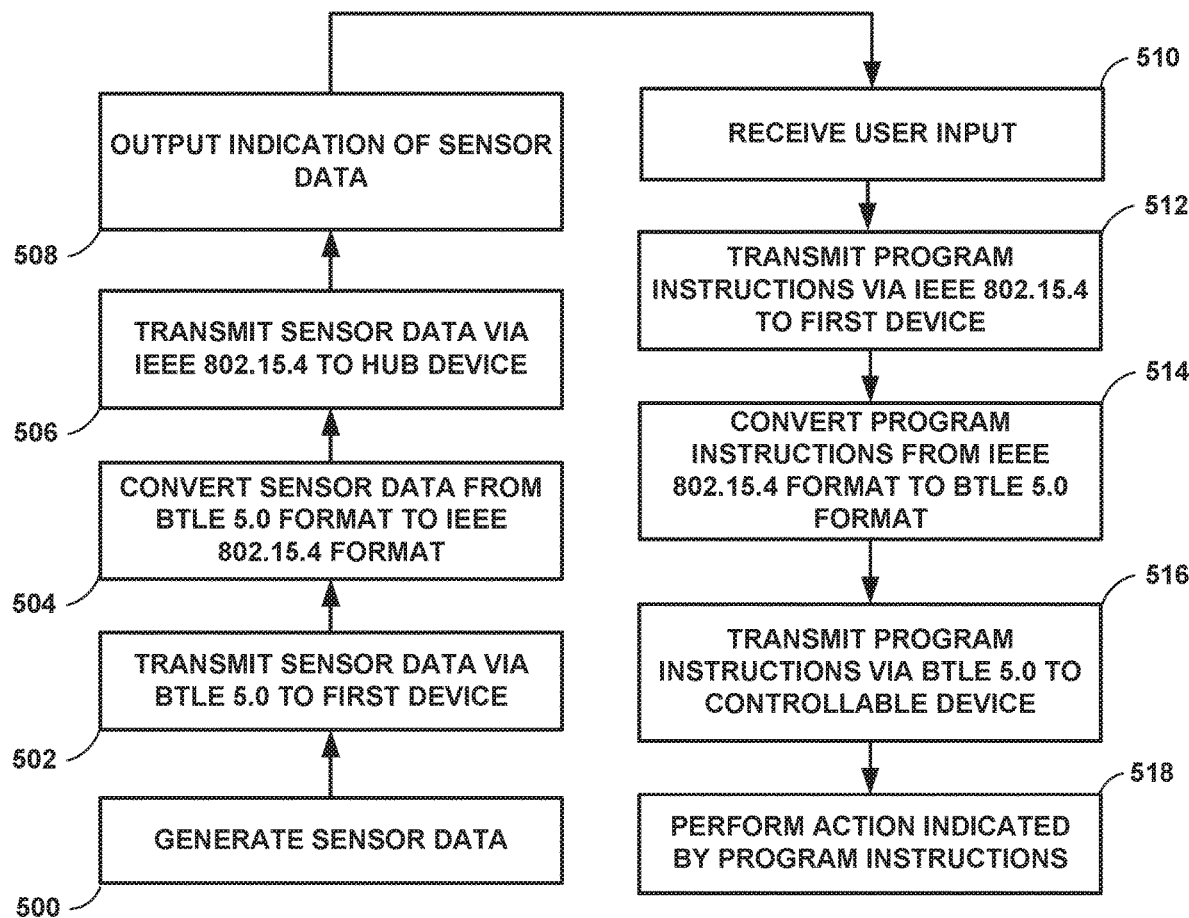
FIG. 5 is a flowchart illustrating example techniques for communicating in a system for comfort or security in a building and the surrounding premises, in accordance with some examples of this disclosure.

FIG. 5 is a flowchart illustrating a method for communicating in a system for comfort or security in a building and the surrounding premises, in accordance with some examples of this disclosure. A battery-powered sensor device 16A (FIG. 4), such as a motion sensor; passive infrared (PIR) sensor; air temperature and/or humidity sensor; air quality sensor (e.g., carbon monoxide or other particulate matter) sensor; or a door or window contact sensor, collects and/or generates sensor data (500). The sensor device 16A wirelessly transmits data, such as the original generated sensor data or an indication of the sensor data, via the Bluetooth Low Energy (BTLE) 5.0 protocol to a separate (e.g., physically distinct) first device 14, which may also be battery powered (502). In some examples, first device 14 may be configured to convert the data from one wireless protocol format to a different wireless protocol format, such as from BTLE 5.0 to IEEE 802.15.4 (504). The first device 14, under the standards set by the BTLE 5.0 protocol, acts as a designated forwarder or repeater and relays the received data to a central hub device 12 (506).

In some examples, having received the sensor data, hub device 12 may output an indication of the sensor data for display, such as on a display screen (508). For example, for a networked comfort system, hub device 12 may display an indication of the temperature, humidity, or air quality on a display screen. For a networked security system, hub device 12 may output an alert indicating the presence of an unauthorized person as detected by sensor 16A.

In some examples, hub device 12 may prompt a user for user input, which may be received via a user interface (510). For example, for a networked comfort system, a user may input a desired temperature for a room. In another example for a networked comfort system, a user may enter user input to activate a ventilation system, and to cause a vent damper to open or close an air vent. For a networked security system, a user may input a command to lock one or more doors, or notify the authorities, in response to the received sensor data.

In other examples, alternatively or additionally to receiving user input, hub device 12 may be configured to generate program instructions automatically in response to processing the received sensor data. For example, in response to receiving sensor data indicating that a room is 75 degrees Fahrenheit, hub device 12 may be configured to generate program instructions commanding a cooling system to activate air conditioning within the building.

Hub device 12 may then transmit the user-input or automatically generated program instructions to an intermediate first device 14, such as via Wi-Fi, IEEE 802.15.4, LTE, or BTLE 5.0 (512). First device 14 may be the same device as the previous first device 14 that relayed the sensor data, or a different first device configured to perform similar functions. For example, first device 14 may then convert the received program instructions from one wireless protocol format into another wireless protocol format, such as from the IEEE 802.15.4 into the BTLE 5.0 format (514).

First device 14 may then forward the converted program instructions to a separate (e.g., physically distinct) controllable device 16B, according to the forwarding standards set by the BTLE 5.0 standard (516). For example, controllable device may be any device configured to perform an action in response to received instructions, and may be a part of, or different from, sensor device 16A. Controllable device 16B may then perform the action indicated or otherwise commanded by the received program instructions, such as to open or close an air vent, activate a heating or cooling system, output an alert, or perform any other action according to the intended function of the controllable device 16B (518).

The following numbered examples demonstrate one or more aspects of the disclosure.

Example 1. A system for comfort or security in a building and premise includes a plurality of first devices configured to wirelessly communicate with a hub device that is a master for controlling the system for comfort or security in the building and premises, wherein the plurality of first devices and the hub device are configured to wirelessly communicate using either one of an IEEE 802.15.4 standard or a Bluetooth Low Energy (BTLE) 5.0 standard; a plurality of second devices that are battery powered and configured to wirelessly communicate with respective ones of the plurality of first devices, wherein the plurality of second devices and respective ones of the plurality of first devices are configured to communicate using the BTLE 5.0 standard, wherein the hub device and the plurality of second devices are configured to communicate with each other via respective ones of the plurality of first devices.

Example 2. The system of example 1, wherein the plurality of first devices includes a smart thermostat; a portal contact sensor; or a motion sensor.

Example 3. The system of examples 1 or 2, wherein the plurality of second devices includes at least one sensor device; and the plurality of second devices is configured to wirelessly communicate with the respective ones of the plurality of first devices by wirelessly transmitting, by the at least one sensor device to at least one first device, sensor data; and the plurality of first devices wirelessly is configured to wirelessly communicate with the hub device by wirelessly transmitting, by the at least one first device to the hub device, the sensor data.

Example 4. The system of any of examples 1-3, wherein the at least one first device is further configured to receive the sensor data from the at least once sensor device via the BTLE 5.0 standard; convert the sensor data from a BTLE 5.0 format to an IEEE 802.15.4 format; and transmit the sensor data to the hub device via the IEEE 802.15.4 standard.

Example 5. The system of any of examples 1-4, wherein the at least one sensor device includes a carbon-monoxide detector; a motion sensor; a portal contact sensor; an air sensor; or a passive infrared sensor.

Example 6. The system of any of examples 1-5, wherein the plurality of second devices includes at least one controllable device; the plurality of first devices is configured to wirelessly communicate with the hub device by wirelessly receiving, by at least one first device from the hub device, program instructions; and the plurality of second devices is configured to wirelessly communicate with the respective ones of the plurality of first devices by wirelessly receiving, by the at least one controllable device from the at least one first device, the program instructions.

Example 7. The system of any of examples 1-6, wherein the at least one first device is further configured to receive the program instructions from the at hub device via the IEEE 802.14.4 standard; convert the program instructions from an IEEE 802.15.4 format to a BTLE 5.0 format; and transmit the program instructions to the at least one controllable device via the IEEE 802.15.4 standard.

Example 8. The system of any of examples 1-7, wherein the at least one controllable device includes an air vent damper configured to open or close an air vent in response to wirelessly receiving the program instructions.

Example 9. The system of any of examples 1-8, wherein the plurality of second devices includes at least one sensor device and at least one controllable device; the at least one sensor device is configured to wirelessly communicate with respective ones of the plurality of first devices by transmitting, to at least one first device, sensor data; the at least one first device is configured to wirelessly communicate with the hub device by transmitting, to the hub device, the sensor data; the at least one first device is further configured to wirelessly communicate with the hub device by receiving, from the hub device, program instructions; and the at least one controllable device is further configured to wirelessly communicate with respective ones of the plurality of first devices by receiving, from the at least one first device, the program instructions.

Example 10. The system of any of examples 1-9, wherein the at least one sensor device includes a carbon-monoxide detector; a motion sensor; a portal contact sensor; an air sensor; or a passive infrared sensor; and the at least one controllable device includes an air vent damper.

Example 11. The system of any of examples 1-10, wherein the at least one controllable device is further configured to perform an action in response to receiving the program instructions.

Example 12. The system of any of examples 1-11, wherein the at least one controllable device includes an air vent damper, wherein the air vent damper is configured to close an air vent in response to receiving the program instructions.

Example 13. The system of any of examples 1-12, wherein each of the plurality of first devices is configured to communicate via the IEEE 802.15.4 standard in a first plurality of time slots and communicate via a BTLE 5.0 standard in a second plurality of time slots, wherein each of the first plurality of time slots is different from each of the second plurality of time slots.

Example 14. A method for communicating in a system for comfort or security in a building and premise includes: wirelessly communicating between a plurality of first devices and a hub device, wherein the hub device is a master for controlling the system for comfort or security in the building and premises, and wherein the plurality of first devices and the hub device are configured to wirelessly communicate using either one of an IEEE 802.15.4 standard or a Bluetooth Low Energy (BTLE) 5.0 standard; and wirelessly communicating between a plurality of second devices that are battery powered, and respective ones of the plurality of first devices using the BTLE 5.0 standard, wherein the hub device and the plurality of second devices are configured to communicate with each other via respective ones of the plurality of first devices.

Example 15. The method of example 14, wherein the plurality of first devices includes a smart thermostat; a portal contact sensor; or a motion sensor.

Example 16. The method of any of examples 14 or 15, wherein at least one of the plurality of second devices includes a sensor device; wirelessly communicating between the plurality of second devices and respective ones of the plurality of first devices includes wirelessly receiving, by at least one first device from the at least one sensor device, sensor data; and wirelessly communicating between the plurality of first devices and the hub device includes wirelessly transmitting, by the at least one first device to the hub device, the sensor data.

Example 17. The method of any of examples 14-16, wherein the at least one sensor device includes a carbon-monoxide detector; a motion sensor; a portal contact sensor; an air sensor; or a passive infrared sensor.

Example 18. The method of any of examples 14-17, wherein the plurality of second devices includes at least one controllable device; wherein wirelessly communicating between the plurality of first devices and the hub device includes wirelessly receiving, by at least one first device from the hub device, program instructions; and wherein wirelessly communicating between a plurality of second devices and the respective ones of the plurality of first devices includes wirelessly transmitting, by the at least one first device to the at least one controllable device, the program instructions.

Example 19. The method of any of examples 14-18, wherein the at least one controllable device includes an air vent damper.

Example 20. The method of any of examples 14-19, wherein the plurality of second devices includes at least one sensor device and at least one controllable device; wirelessly communicating between the plurality of second devices and the respective ones of the plurality of first devices includes transmitting, by the at least one sensor device, and receiving, by at least one first device, sensor data; wirelessly communicating between the plurality of first devices and the hub device, includes transmitting, by the at least one first device, and receiving, by the hub device, the sensor data; wirelessly communicating between the plurality of first devices and the hub device further includes transmitting, by the hub device, and receiving, by the at least one first device, program instructions; and wirelessly communicating between the plurality of second devices and the respective ones of the plurality of first devices further includes transmitting, by the at least one first device, and receiving, by the at least one controllable device, the program instructions.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, including those attributed to sensors 121 and controller device 118, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A system for comfort or security in a building and premise, the system comprising:
a plurality of first devices configured to wirelessly communicate with a hub device that is a master for controlling the system for comfort or security in the building and premises, wherein the plurality of first devices and the hub device are configured to wirelessly communicate using either one of an IEEE 802.15.4 standard or a Bluetooth Low Energy (BTLE) 5.0 standard;
a plurality of second devices that are battery powered and configured to wirelessly communicate with respective ones of the plurality of first devices, wherein the plurality of second devices and respective ones of the plurality of first devices are configured to communicate using the BTLE 5.0 standard,
wherein the hub device and the plurality of second devices are configured to communicate with each other via respective ones of the plurality of first devices, and
wherein at least one of:
the plurality of second devices comprises at least one sensor device;
the plurality of first devices comprises a first device configured to:
receive sensor data from the at least one sensor device via the BTLE 5.0 standard;
convert the sensor data from a BTLE 5.0 format to an IEEE 802.15.4 format and
transmit the sensor data to the hub device via the IEEE 802.15.4 standard; or
the plurality of second devices comprises at least one controllable device;
the plurality of first devices comprises a second device configured to:
receive program instructions from the hub device via the IEEE 802.14.4 standard;
convert the program instructions from the IEEE 802.15.4 format to the BTLE 5.0 format and
transmit the program instructions to the at least one controllable device via the IEEE 802.15.4 standard.

2. The system of claim 1, wherein the plurality of first devices comprises:
a smart thermostat;
a portal contact sensor; or
a motion sensor.

3. The system of claim 1, wherein the at least one sensor device comprises:
a carbon-monoxide detector;
a motion sensor;
a portal contact sensor;
an air sensor; or
a passive infrared sensor.

4. The system of claim 1, wherein the at least one controllable device comprises an air vent damper configured to open or close an air vent in response to wirelessly receiving the program instructions.

5. The system of claim 1, wherein:
the at least one sensor device comprises:
a carbon-monoxide detector;
a motion sensor;
a portal contact sensor;
an air sensor; or
a passive infrared sensor; and
the at least one controllable device comprises:
an air vent damper.

6. The system of claim 1, wherein the at least one controllable device is further configured to perform an action in response to receiving the program instructions.

7. The system of claim 6, wherein the at least one controllable device comprises an air vent damper, wherein the air vent damper is configured to close an air vent in response to receiving the program instructions.

8. The system of claim 1, wherein each of the plurality of first devices is configured to communicate via the IEEE 802.15.4 standard in a first plurality of time slots and communicate via the BTLE 5.0 standard in a second plurality of time slots, wherein each of the first plurality of time slots is different from each of the second plurality of time slots.

9. The system of claim 1,
wherein the plurality of second devices comprises both the at least one sensor device and the at least one controllable device, and
wherein the plurality of first devices comprises both the first device of the plurality of first devices and the second device of the plurality of first devices.

10. A method for communicating in a system for comfort or security in a building and premise, the method comprising:
wirelessly communicating between a plurality of first devices and a hub device, wherein the hub device is a master for controlling the system for comfort or security in the building and premises, and wherein the plurality of first devices and the hub device are configured to wirelessly communicate using either one of an IEEE 802.15.4 standard or a Bluetooth Low Energy (BTLE) 5.0 standard; and
wirelessly communicating between a plurality of second devices that are battery powered, and respective ones of the plurality of first devices using the BTLE 5.0 standard, wherein the hub device and the plurality of second devices are configured to communicate with each other via respective ones of the plurality of first devices, and
wherein at least one of:
the plurality of second devices comprises at least one sensor device;
the method further comprising:
receiving, with a first device of the plurality of first devices, sensor data from the at least one sensor device via the BTLE 5.0 standard;
converting, with the first device of the plurality of first devices, the sensor data from a BTLE 5.0 format to an IEEE 802.15.4 format and transmitting, with the first device of the plurality of first devices, the sensor data to the hub device via the IEEE 802.15.4 standard; or the plurality of second devices comprises at least one controllable device;
the method further comprising:
receiving, with a second device of the plurality of first devices, program instructions from the hub device via the IEEE 802.14.4 standard;
converting, with the second device of the plurality of first devices, the program instructions from the IEEE 802.15.4 format to the BTLE 5.0 format and transmitting, with the second device of the plurality of first devices, the program instructions to the at least one controllable device via the IEEE 802.15.4 standard.

11. The method of claim 10, wherein the plurality of first devices comprises:
a smart thermostat;
a portal contact sensor; or
a motion sensor.

12. The method of claim 10, wherein the at least one sensor device comprises:
a carbon-monoxide detector;
a motion sensor;
a portal contact sensor;
an air sensor; or
a passive infrared sensor.

13. The method of claim 10, wherein the at least one controllable device comprises an air vent damper.

14. The method of claim 10, wherein:
wherein the plurality of second devices comprises both the at least one sensor device and the at least one controllable device, and
wherein the plurality of first devices comprises both the first device of the plurality of first devices and the second device of the plurality of first devices.

* * * * *

UNITED STATES PATENT AND TRADEMARK OFFICE
CERTIFICATE OF CORRECTION

PATENT NO. : 11,445,348 B2
APPLICATION NO. : 16/751149
DATED : September 13, 2022
INVENTOR(S) : Robert D. Juntunen and Steven C. Nichols It is certified that error appears in the above-identified patent and that said Letters Patent is hereby corrected as shown below:

In the Specification

Column 12, Line 64, DELETE "802.14.4" and INSERT --802.15.4--

In the Claims

Claim 1, Column 16, Line 26, DELETE "802.14.4" and INSERT --802.15.4--

Claim 10, Column 18, Line 9, DELETE "802.14.4" and INSERT --802.15.4--

Signed and Sealed this
Fifteenth Day of November, 2022

Katherine Kelly Vidal
*Director of the United States Patent and Trademark Office*